Jan. 6, 1942.　　　A. SCHUMANN　　　2,268,965
METHOD OF MOLDING REINFORCED BUILDING PANELS
Filed Feb. 16, 1940
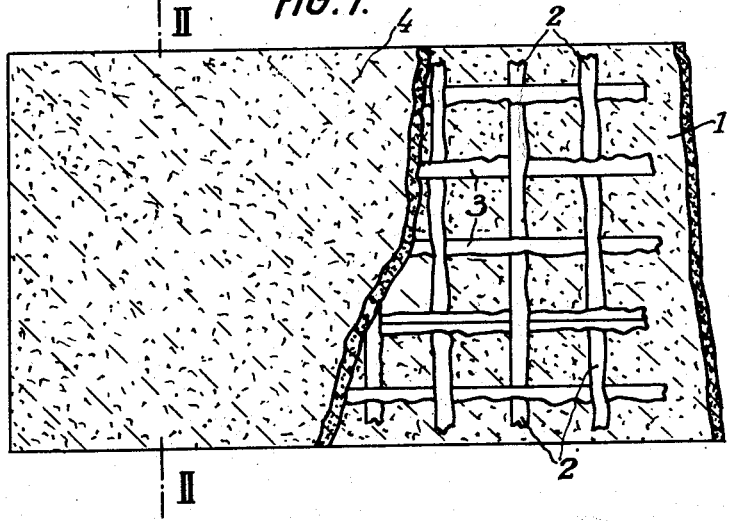
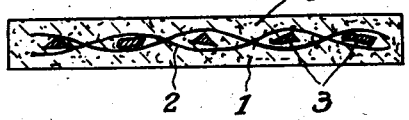
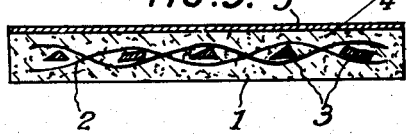
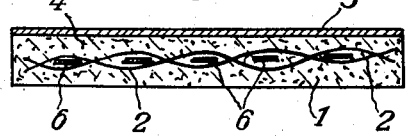
Inventor
A. Schumann
By:
Glascock Downing Seebold
Attorneys.

Patented Jan. 6, 1942

2,268,965

UNITED STATES PATENT OFFICE 2,268,965

METHOD OF MOLDING REINFORCED BUILDING PANELS

Artur Schumann, Küstrin-Neustadt, Germany

Application February 16, 1940, Serial No. 319,369
In Norway May 2, 1939

5 Claims. (Cl. 25—154)

It is known to use plates, especially for building purposes, consisting of a filling substance, for example sawdust or shavings, mixed with a binding material hardening by setting, such as gypsum or cement, and subsequently compressed. For this purpose, the substance to be pressed in a special press mold was hitherto prepared in a mixing container, by mixing in this container for example sawdust, gypsum, and the required amount of water, and then filling the wet substance prepared in this way into the press mold and distributing it therein. With this method it is difficult to prepare in the mixing container a perfectly homogeneous substance with absolutely uniform distribution of the binding material. The substance, especially if gypsum is used, tends to form lumps whereby the homogeneity and, therefore, the strength of the plate is reduced. The uniform distribution of the wet and partly lumpy substance in the press mold is also connected with difficulties. Another considerable disadvantage of the method mentioned above consists in the fact that in using rapidly setting materials, such as gypsum, the plate must be finished quickly. In case of any disturbances during the working process, the substance will set too early and will be unsuitable for further working. Such difficulties occur especially when it is necessary to place reinforcements in the substance, particularly if these reinforcements do not consist of iron but of wooden parts with a corresponding width.

The disadvantages mentioned above are obviated by the working method according to the present invention in a simple manner by mixing the filling substance with the binding material in dry state and by placing the dry substance in the press mold and uniformly distributing it therein, whereupon water is sprayed finely distributed on the substance, and finally the whole is pressed. The mixing of the filling substance with the binding material as well as the distribution of the substance in the mold is considerably simplified by this working method. But first of all, a perfectly homogeneous plate with uniform strength in all parts is obtained by this method. The plate made in this way has a greater density and therefore a greater resistance to compression. The uniform strength or the increased strength is due to the fact that the binding material is perfectly uniformly distributed in the substance and that, in consequence of being sprayed with water in fine distribution, the binding material is caused to set uniformly in all parts. In applying the new process, it is advantageous to use atomizing nozzles for spraying the water, which is supplied to the nozzles under pressure and is very finely atomized by the nozzles. Thus, if a large number of uniformly distributed atomizing nozzles are arranged, the filling substance mixed with binding material is perfectly uniformly moistened. After spraying the water, the plate is pressed, whereby the filling substance is compressed to about one half of its height. When the plate has been pressed, it is dried in known manner, for example in a wind tunnel.

As the water is only added to the filling substance when the latter is uniformly distributed in the press mold, the time required for the setting of the filling substance can be used for further operations, which is also an advantage in case of disturbances in the working process.

According to the process described above, it is possible to produce plates of any desired kind. For example, the plate may be made so that an external veneer is first placed in the press mold, to which veneer the mixed dry filling substance is applied, and after the latter has been moistened by spraying, a further external veneer is put on the top, and the whole is finally pressed. Of course, the plate may also be provided with a reinforcement, especially of waste wood strips, by first placing an external veneer in the press mold, then mixing the filling substance and applying it in dry state in a thin layer, moistening it by spraying, then placing the reinforcement, for example waste wood strips, on the top, again applying a thin layer of filling substance in dry state and distributing it over the reinforcement, moistening the filling substance by spraying, and finally combining the filling substance with the reinforcement by pressing in the press mold.

With certain binding materials it is also possible to proceed in such a way that the filling substance below as well as above the reinforcement is first applied absolutely dry and then the entire filling substance is moistened by spraying.

The invention is illustrated diagrammatically in the accompanying drawing by way of example, showing a pressed plate, a portion of the top layer being broken away in the drawing for clearness of illustration.

In the drawing, I denotes a layer of a filling substance, especially sawdust, mixed with a binding material, for example gypsum, as placed, according to the invention, in a press mold, not shown in the drawing, after mixing the component parts and in dry state, and then being moistened with water by means of atomizing nozzles. The reinforcement 2 and 3 consists, in the constructional example illustrated, of braided waste wood strips which are placed on the layer 1. A further layer 4 of sawdust and gypsum is applied in dry state to the reinforcement on the layer 1 and is then moistened by means of atomizing nozzles. The layers are illustrated so as they appear after the whole is compressed.

Fig. 2 shows, in the constructional example illustrated, the parts 3 of the reinforcement consisting of waste wood strips of any kind, whereas the parts 2 consist of waste veneer strips which are easily braided with the other waste wood strips, as will be seen from Fig. 1, with correspondingly large spaces between the individual parts.

In the constructional example illustrated in Fig. 3, an external veneer 5 is first placed in the press mold, but otherwise the procedure is the same. In this case too, the reinforcement consists partly of waste wood strips 3 and partly of waste veneer strips 2.

In the constructional example according to Fig. 4, the procedure is as above, but the reinforcement consists in both directions of waste veneer strips 2 and 6.

What I claim is:

1. A method of producing a pressed plate of a sawdust filling substance and a gypsum binding material which comprises, mixing the filling substance with the binding material in a dry state, placing the mixture in a dry state in a mold and uniformly distributing the mixture in a thin layer therein, spraying water in a finely distributed state onto the layer, interweaving widely spaced waste wood strips and placing the same on said layer, applying a mixture of the filling substance and the binding material in a dry state over the wood strips and uniformly distributing the mixture in a thin layer, spraying water in a finely distributed state onto the second layer, and compressing the assembly.

2. A method of producing pressed plates of a sawdust filling substance and a gypsum binding material which comprises, mixing the filling substance with the binding material in a dry state, placing the mixture in a dry state in a mold and uniformly distributing the mixture as a thin layer within the mold, spraying the layer with water in a finely distributed condition, interweaving waste veneer strips so as to provide relatively large interstices between these veneer strips and placing the veneer strips on the assembled layer, applying a mixture of the filling substance and the binding material in a dry state over the veneer strips and uniformly distributing the mixture in a thin second layer, spraying water on the second layer in a finely distributed state, and compressing the assembly.

3. A method of producing pressed plates of a sawdust filling substance and a gypsum binding material which comprises, placing a wood veneer material in a mold, mixing the filling substance with the binding material in a dry state, applying the mixture in a dry state onto the wood veneer within the mold, distributing the mixture in a thin layer on said wood veneer, spraying water in a finely divided state onto the layer, interweaving widely spaced waste wood strips and placing the same on said layer, applying a mixture of the filling substance and the binding material in a dry state over the wood strips and uniformly distributing the mixture in a thin second layer, spraying the second layer with water in a finely distributed state, and compressing the assembly.

4. A method of producing a pressed plate of a sawdust filling substance and a gypsum binding material which comprises, mixing the sawdust with the gypsum in a proportion of about 40 to 50 by weight in a dry state, placing the mixture in a dry state in a mold and uniformly distributing the mixture in a thin layer therein, spraying water in a finely divided condition onto the layer, interweaving widely spaced waste wood strips of a weight of approximately 10% of the weight of the sawdust and the gypsum and placing the interweaved wood strips on said layer, applying a mixture of the filling substance and the binding material in a dry state over the wood strips and uniformly distributing the mixture in a thin second layer, spraying water in a finely distributed state onto the second layer, and compressing the assembly.

5. A method of producing a pressed plate of a sawdust filling substance and a gypsum binding material which comprises, placing wood veneer in a mold, mixing the sawdust with the gypsum in a proportion of about 40 to 50 by weight in a dry state, applying the mixture in a dry state onto the wood veneer in the mold and uniformly distributing the mixture into a thin layer, spraying water in a finely distributed state onto said layer, interweaving widely spaced waste wood strips of a weight of about 10% of the weight of the sawdust in the gypsum and placing the waste wood strips on said layer, applying a mixture of the sawdust gypsum in a dry state over the wood strips and uniformly distributing the mixture in a thin second layer, spraying water in a finely distributed state onto the second layer, and compressing the assembly.

ARTUR SCHUMANN.